United States Patent [19]

Tsai

[11] Patent Number: 5,903,001
[45] Date of Patent: May 11, 1999

[54] MULTIPLE-RESOLUTION IMAGE SCANNING APPARATUS HAVING PLURAL IMAGING SYSTEMS WITH A SWITCHING DEVICE

[76] Inventor: Shui Chuan Tsai, No. 3, Alley 80, Lane 108, Sec. 1, Kuang-Fu Road, Hsinchu, Taiwan

[21] Appl. No.: 08/967,334

[22] Filed: Oct. 21, 1997

[51] Int. Cl.[6] ...................................................... H01J 3/14
[52] U.S. Cl. .................. 250/234; 250/208.1; 358/474
[58] Field of Search ................................. 250/234, 235, 250/208.1, 556; 358/474, 486, 482, 497, 498; 355/89, 102, 30

[56] References Cited

U.S. PATENT DOCUMENTS 4,183,656  1/1980  Ishihara et al. ........................... 355/30

*Primary Examiner*—Que T. Le
*Attorney, Agent, or Firm*—Pro-Techtor International Services

[57] ABSTRACT

The present invention relates to a multiple-resolution image scanning apparatus, comprising: a main body with at least one carrier for accommodating an object of one of several data types to be scanned; and a scanning system, installed in the main body and movable parallel to the carrier. The scanning system further comprises: a detector; a light source for illuminating the object; at least two imaging systems with lenses and mirror groups, which alternatively generate an image of an object on the detector at different resolutions and with different light paths; and a switching system, which moves the imaging systems and the detector relative to each other into reading positions, wherein in each of the reading positions the image is generated on the detector by one of the imaging systems. This allows to scan objects of different data types.

20 Claims, 17 Drawing Sheets

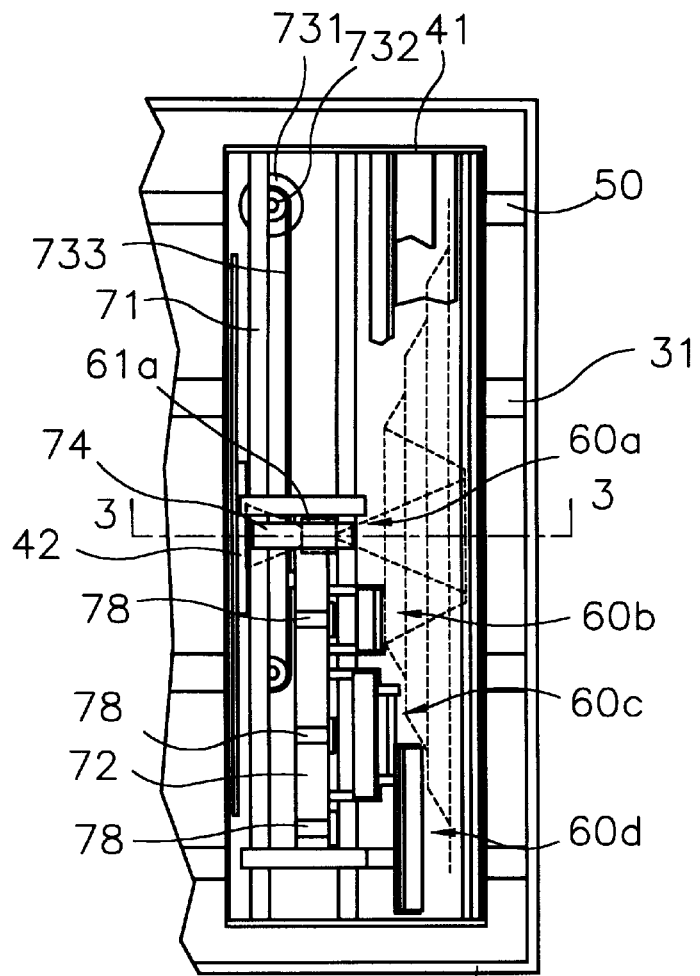
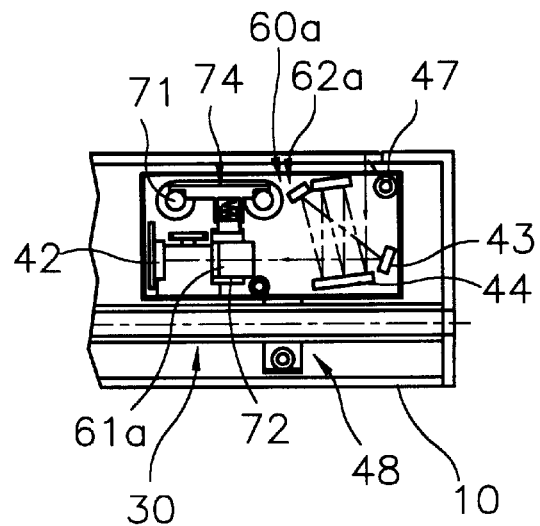
FIG 4
FIG 5a
FIG 5

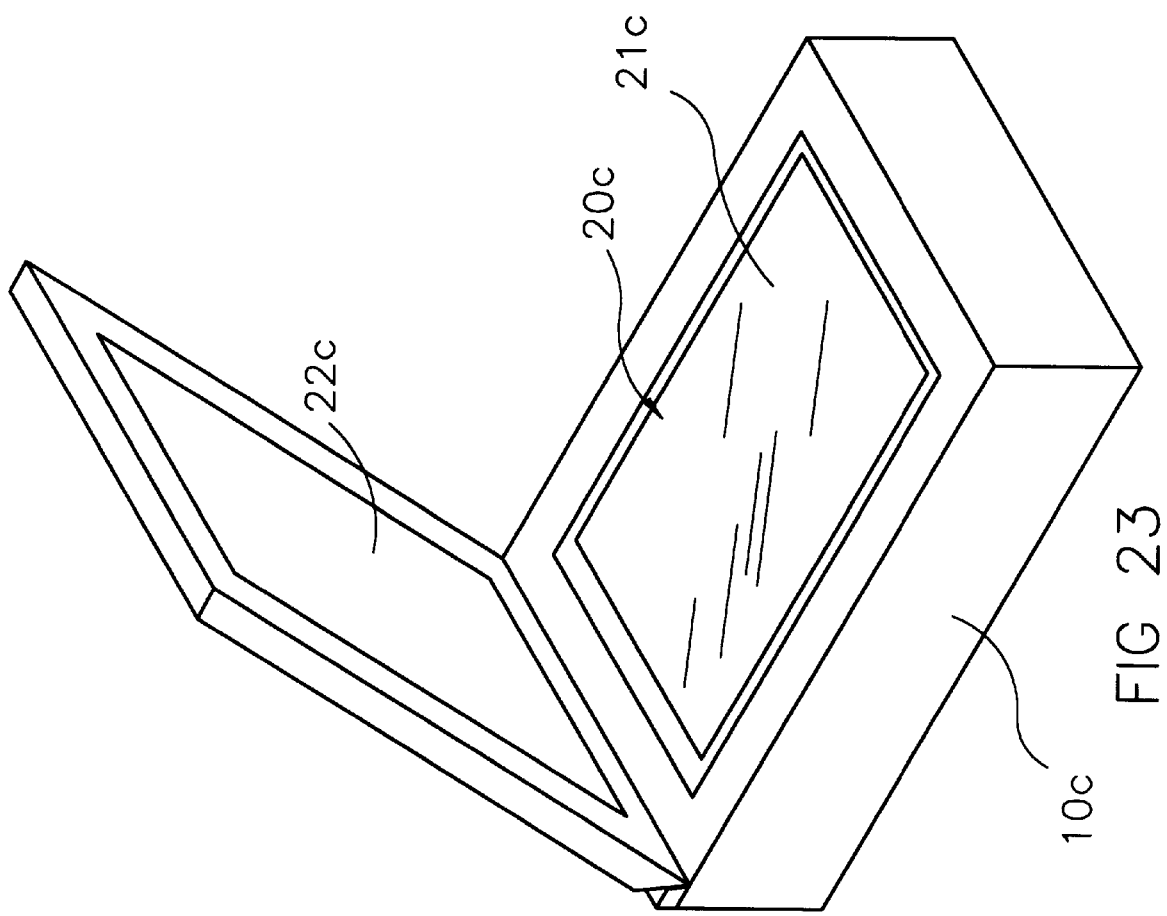

MULTIPLE-RESOLUTION IMAGE SCANNING APPARATUS HAVING PLURAL IMAGING SYSTEMS WITH A SWITCHING DEVICE

BACKGROUND OF THE INVENTION

1. Field of the Invention

The present invention relates to a multiple-resolution image scanning apparatus, particularly to a multiple-resolution image scanning apparatus which offers at least two optical resolutions for various types of image data.

2. Description of Related Art

Conventionally, data of different types are read by image scanning apparatuses of different resolutions and with different areas. For example, normal text is usually read from an A4 area with a resolution of 300 dpi. For color photographs, 4 inch and 600 dpi are regularly used values for size and resolution. Slides and negative films require a resolution of 1200 dpi for satisfactory results, but typically only a size of about 6 cm.

Conventional image scanning apparatuses aim at only one application for a certain image data type. Most image scanning apparatuses on the market are designed for A4 areas at a comparatively low resolution. For scanning photographs, image scanning apparatuses with a smaller scanned area and higher resolution are available. Any user purchasing an image scanning apparatus needs to consider the intended application and decide which type of image scanning apparatus is most suitable. For various applications, several image scanning apparatuses are needed, which is not convenient.

For overcoming the deficiency of conventional image scanning apparatuses of only one application, multiple-resolution image scanning apparatuses have appeared on the market. For example, Taiwan patent no. 232398 "Multiple lens switching system" reveals such an image scanning apparatus. By switching between various lenses, the resolution is varied. However, the various lenses are arranged nearly in a row, in front of each other, making the volume needed large.

Therefore, under Ser. No. 08/851,764 "Multiple resolution image scanning module", a multiple-resolution image scanning apparatus has been taught, which comprises: a detector (charge-coupled device); a light source; a gliding system with rails and a gliding seat gliding thereon; at least two lenses with different optical resolutions and at least two mirror groups, corresponding thereto. The at least two lenses are mounted on the gliding seat. The mirror groups are all or partly mounted on the gliding seat, too. By moving the gliding seat, the at least two lenses and the corresponding mirror groups are alternatively brought into the light path between light source and charge-coupled device, allowing for changing resolutions and scanned areas. Since for changing resolutions the light path is varied by moving the corresponding mirror groups along with the lenses, the volume required is about the same as for conventional single-resolution image scanning apparatuses.

However, the multiple-resolution image scanning apparatus revealed under Ser. No. 08/851,764 "Multiple resolution image scanning module" allows only for a single carrier for a scanned object, which still means a restriction of scanned data types. Objects to be scanned at different resolutions are laid on the same position, but with different scanned areas. The appropriate position of the lenses and mirror groups is hard to find, limiting the number of applicable lenses and mirror groups.

SUMMARY OF THE INVENTION

It is therefore the main object of the present invention to provide a multiple-resolution image scanning apparatus with at least two resolutions.

Another object of the present invention is to provide a multiple-resolution image scanning apparatus which allows to switch between various data types.

A further object of the present invention is to provide a multiple-resolution image scanning apparatus which allows to scan an object by reflected light or by transmitted light.

The present invention can be more fully understood by reference to the following description and accompanying drawings.

BRIEF DESCRIPTION OF THE DRAWINGS

FIG. 4 is a top view of the image scanning apparatus of the present invention in the first embodiment, while the first data type is read at the first resolution.

FIG. 5 is a sectional view of the image scanning apparatus of FIG. 4, taken along line 3—3.

FIG. 5a is a sectional view of the positioning device.

FIG. 23 is a perspective outside view of the image scanning apparatus of the present invention in the fourth embodiment.

DETAILED DESCRIPTION OF THE PREFERRED EMBODIMENTS

The present invention is a multiple-resolution image scanning apparatus, particularly a multiple-resolution image scanning apparatus which offers various resolutions for various types of image data, like text, color photographs and films.

Figure 1:
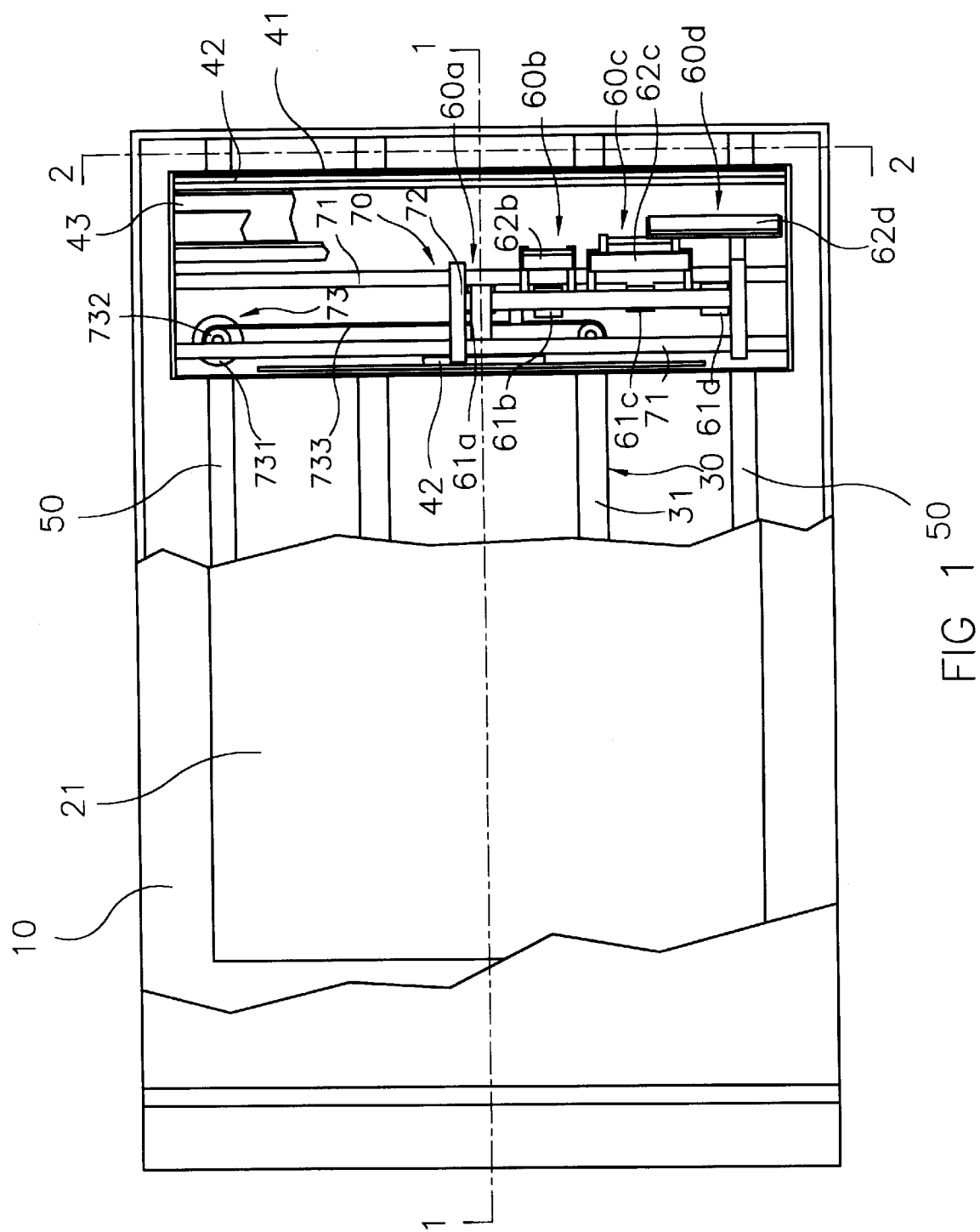
FIG. 1 is a top view of the image scanning apparatus of the present invention in the first embodiment.
Figure 2:
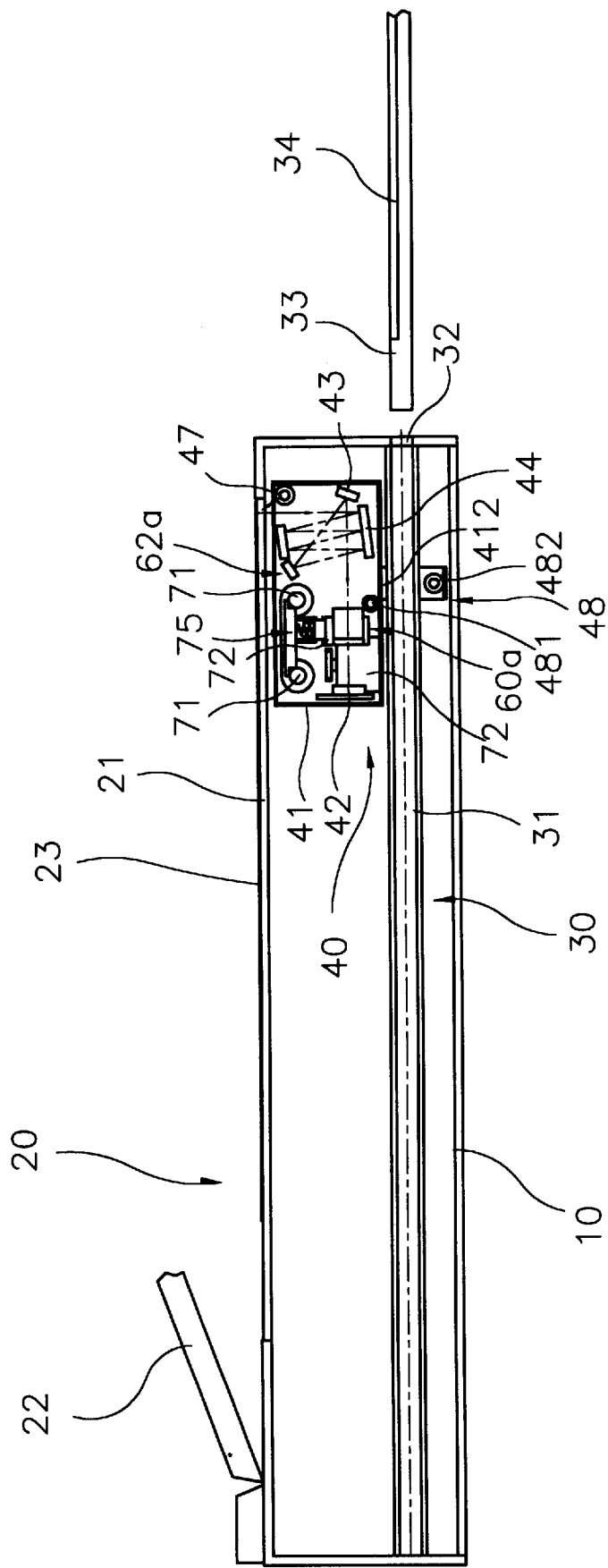
FIG. 2 is a longitudinal sectional view of the image scanning apparatus of FIG. 1, taken along line 1—1.
Figure 3:
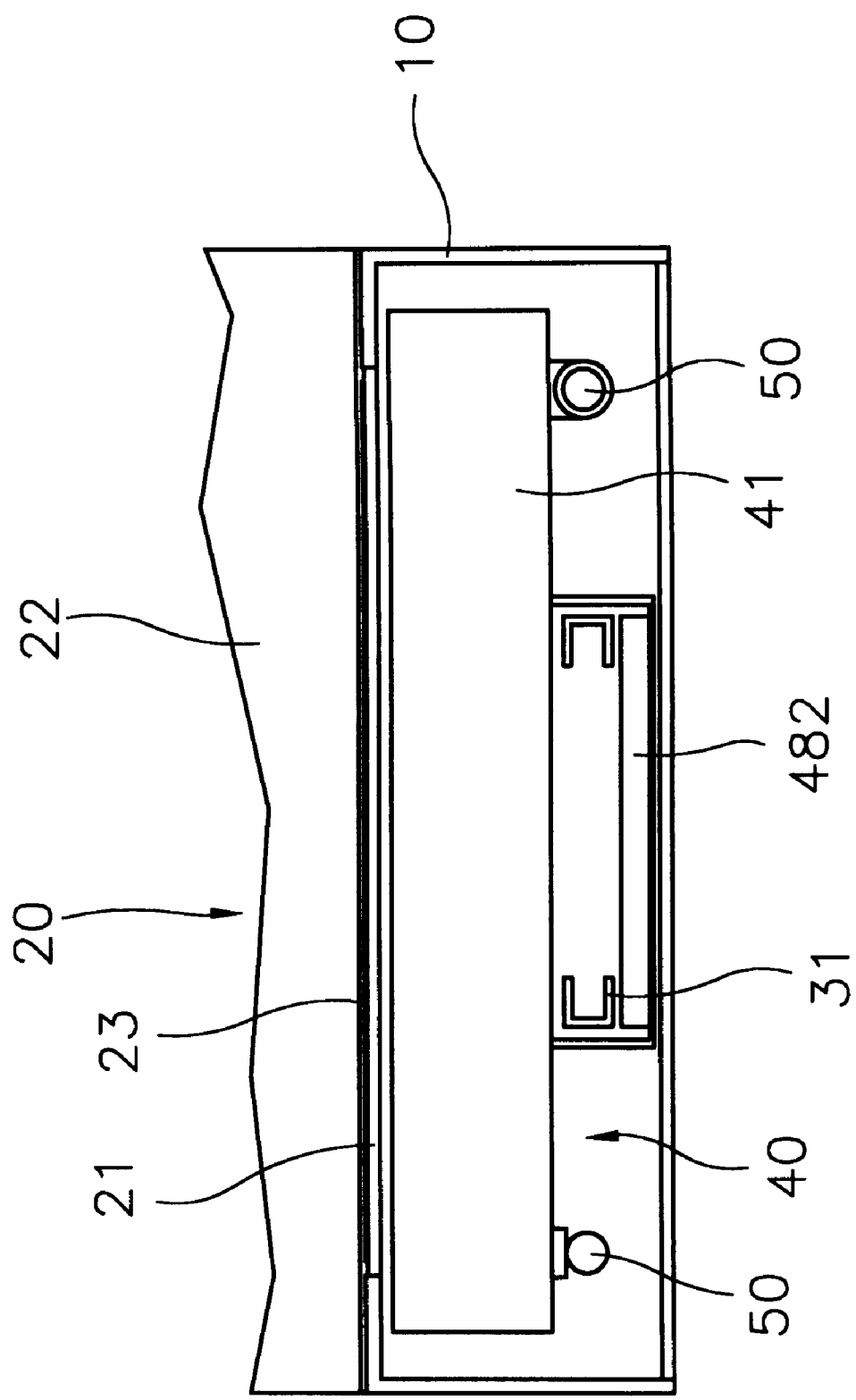
FIG. 3 is a transverse sectional view of the image scanning apparatus of FIG. 1, taken along line 2—2.

Referring to FIGS. 1–3, the multiple-resolution image scanning apparatus in a first embodiment mainly comprises: a main body 10 with a top side and lateral sides, which define a longitudinal and a transverse direction; a first carrier 20, parallel to the longitudinal and transverse directions on the top side of the main body 10, on which a scanned object of the first data type is laid and where data of the first data type are read; a second carrier 30 below the first carrier 20 and parallel thereto, on which a scanned object of the second data type is laid and where data of the second data type are read; a scanning system 40, mounted between the first and second carriers 20, 30 and linearly movable parallel to the first and second carriers 20, 30; and a longitudinal gliding system 50 with at least one rail inside the main body 10, which is oriented parallel to the first carrier 20, with the scanning system 40 mounted thereon.

In the first embodiment, the first carrier 20 has an area large enough to accommodate a text page or a large photograph, which have a data type requiring only a normal resolution. The second carrier 30 is used for photographs and films with small areas, but of a data type requiring a higher resolution. The scanning system 40 has imaging systems 60a, 60b, 60c, 60d of various resolutions, light paths and scanned areas. For reading data of various types with the image scanning apparatus of the present invention, the scanning system 40 is switched to suitable resolutions, light paths and scanned areas. Therefore the image scanning apparatus of the present invention allows to read data of various types properly.

Referring to FIG. 2, the first carrier 20 has a transparent plate 21, allowing an object of first data type 23 to be laid thereon. The second carrier 30 has an insertion slot 31 inside the main body 10 with an opening 32 to the outside thereof and a tray 33. An object of second data type 34 is laid on the tray 33, which is inserted in the slot 31 through the opening 32 for the object of second data type 34 to be scanned.

The scanning system 40 is mounted on the longitudinal gliding system 50. The scanning system 40 has a casing 41, a detector 42 (charge-coupled device) and several imaging systems 60a, 60b, 60c, 60d. The imaging systems 60a, 60b, 60c, 60d provide various light paths with a first, second, third and fourth resolution, respectively, creating images of the objects of first and second data types 23, 34 on the detector 42 to be read there. The scanning system 40 further has a first light source 47 and a second light source 48 for illuminating the objects of first and second data types 23, 34, respectively.

The imaging systems 60a, 60b, 60c, 60d are respectively provided with lenses 61a, 61b, 61c, 61d and mirror groups 62a, 62b, 62c, 62d, corresponding thereto. The lenses 61a, 61b, 61c, 61d have different scanned areas for different resolutions, and the mirror groups 62a, 62b, 62c, 62d, together with fixed mirrors 43, 44, determine different light paths, which ensure proper imaging of the objects of first and second data types 23, 34 on the detector 42.

The resolutions and light paths provided by the imaging systems 60a, 60b, 60c, 60d are based on the areas of and the resolutions required by the objects of first and second data types 23, 34. So for each of the objects of first and second data types 23 and 34, one of the imaging systems 60a, 60b, 60c, 60d creates an optical image on the detector 42.

The first light source 47 is a reflection light source, illuminating the object of first data type 23. The first light source 47 is mounted below the first carrier 20, between the first carrier 20 and the imaging systems 60a, 60b, 60c, 60d. Light originating therefrom is reflected by the object of first data type 23, passing through one of the imaging systems 60a, 60b, 60c, 60d and reaching the detector 42. The second light source 48 comprises a reflection light source 481 and a transmission light source 482. The reflection light source 481 is mounted above the second carrier 30, illuminating the upper surface of the object of second data type 34. The transmission light source 482 is mounted below the second carrier 30, illuminating the object of second data type 34, with light passing therethrough, through the second carrier 30 and an elongated hole 412 into the casing 41. For scanning a large or medium-sized object by reflection, the first light source 47 is used. For scanning a small object by reflection, like a photograph, the reflection light source 481 of the second light source 48 is used. For scanning a small object by transmission, like a film, the transmission light source 482 of the second light source 48 is used.

The scanning system 40 further has a switching device 70 for switching between the imaging systems 60a, 60b, 60c, 60d by alternatively bringing them into transverse reading positions, where images of the scanned objects are generated on the detector. Thus the switching device allows to switch resolutions, as required by the objects of first and second data types 23, 34.

The switching device 70 comprises: several rails 71, mounted inside the casing 41, roughly oriented in the transverse direction; a gliding seat 72, gliding on the rails 71 and carrying the imaging systems 60a, 60b, 60c, 60d; a driving system 73; and at least one positioning device 74. The driving system 73 has a motor 731, at least one reel 732, and a driving-belt, which is connected to the gliding seat 72 for driving the gliding seat 72 along the rails 71 and bringing one of the imaging systems 60a, 60b, 60c, 60d into the reading positions. The at least one positioning device 74 serves to fix the gliding seat 72 in the reading positions. As shown in FIG. 5a, the positioning device 74 comprises: a holder 75, which is fastened to the casing 41 in the inside thereof; a blocking element 76, glidingly mounted on the holder 75; a spring 77, inserted between the holder 75 and the blocking element 76 and pressing the blocking element 76 to project out of the holder 75; and several positioning depressions 78 on the gliding seat 72 for engaging with the blocking element 76. When the gliding seat 72 moves along the transverse direction, the positioning depressions 78 thereon engage with the blocking element 76 of the at least one positioning device 74 in the reading positions. Thus, for reading various data types, the imaging systems 60a, 60b, 60c, 60d are stably positioned.

In FIGS. 4–11 reading data of various types is shown. Referring to FIGS. 4 and 5, when the object of first data type 23 is read at the first resolution, the imaging system 60a is brought in front of the detector 42, generating an image of the object of first data type 23 on the detector 42.

Figure 6:
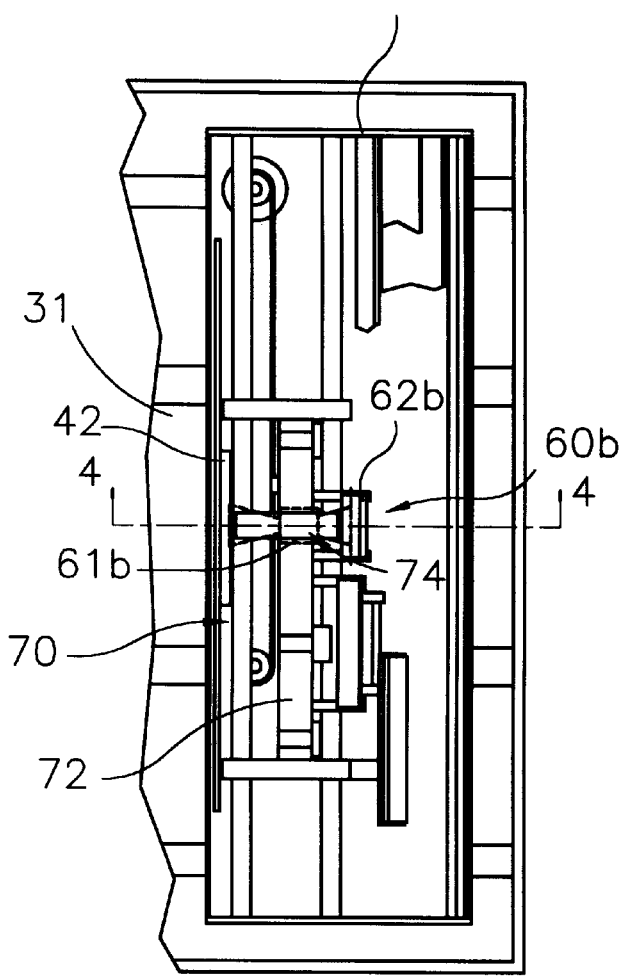
FIG. 6 is a top view of the image scanning apparatus of the present invention in the first embodiment, while the second data type is read at the second resolution.
Figure 7A:
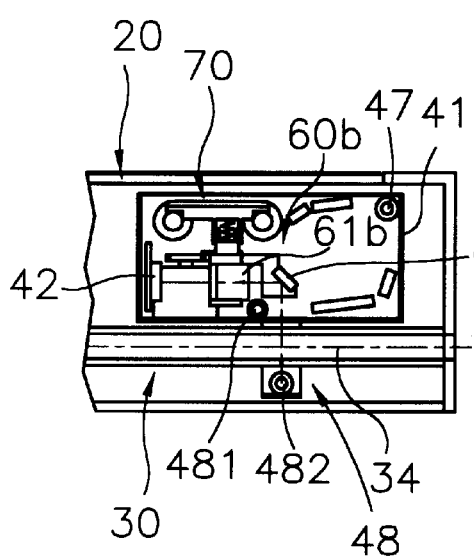
FIGS. 7a, 7b are sectional views of the image scanning apparatus of FIG. 6, taken along line 4—4, when the second data type is read under reflection and transmission at the second resolution.
Figure 7B:
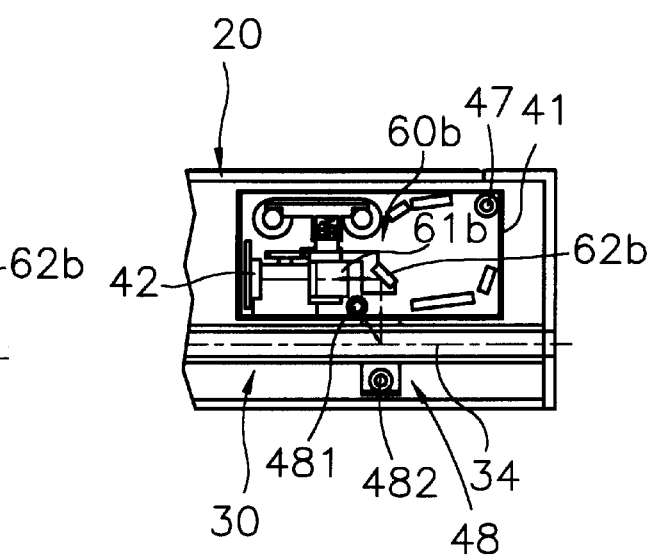

The object of second data type 34 has a relatively small area and is viewed by reflected light (like a photograph) or by transmitted light (like a film), requiring a better resolution than the first resolution. Referring to FIGS. 6, 7a and 7b, when the object of second data type 34 is read at the second resolution, the imaging system 60b is positioned to generate an image of the object of second data type 34 on the detector 42. As shown in FIG. 7a, for transmitted light the transmission light source 482 is used. As shown in FIG. 7b, for reflected light the reflection light source 481 is used.

Figure 8:
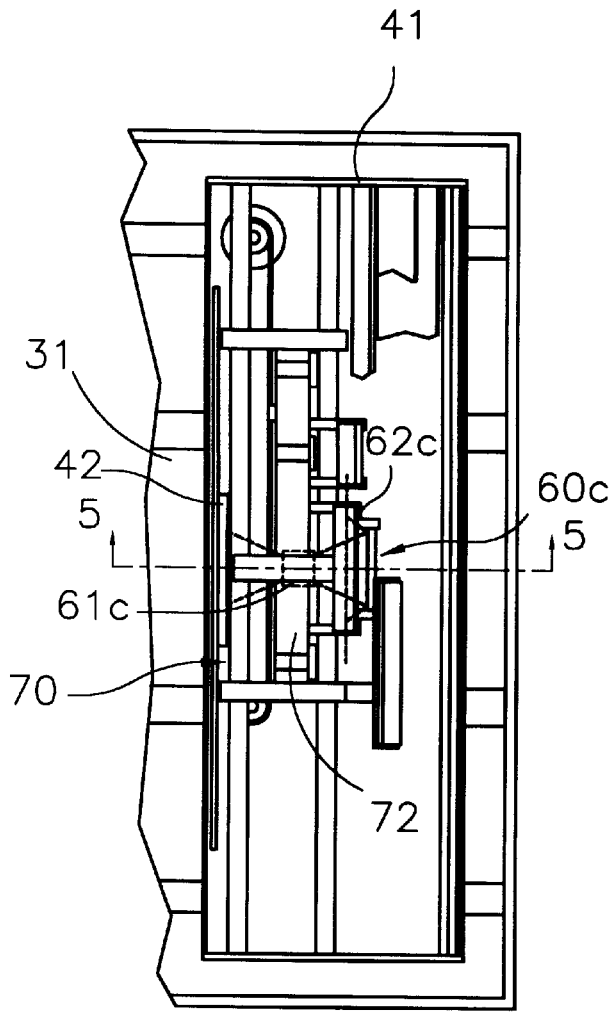
FIG. 8 is a top view of the image scanning apparatus of the present invention in the first embodiment, while the second data type is read at the third resolution.
Figure 9A:
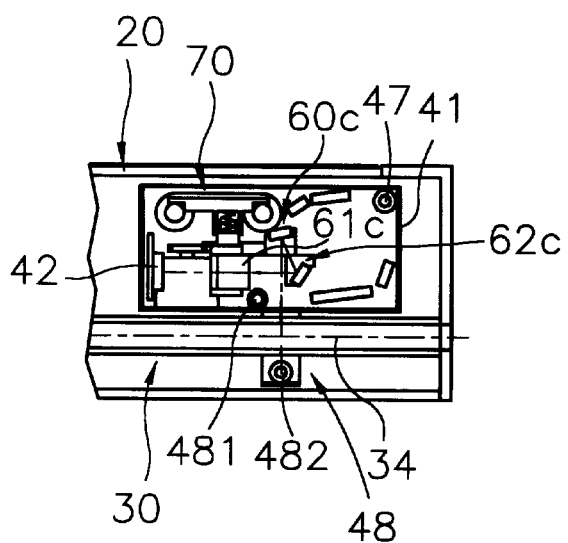
FIGS. 9a, 9b are sectional views of the image scanning apparatus of FIG. 8, taken along line 5—5, when the second data type is read under reflection and transmission at the third resolution.
Figure 9B:
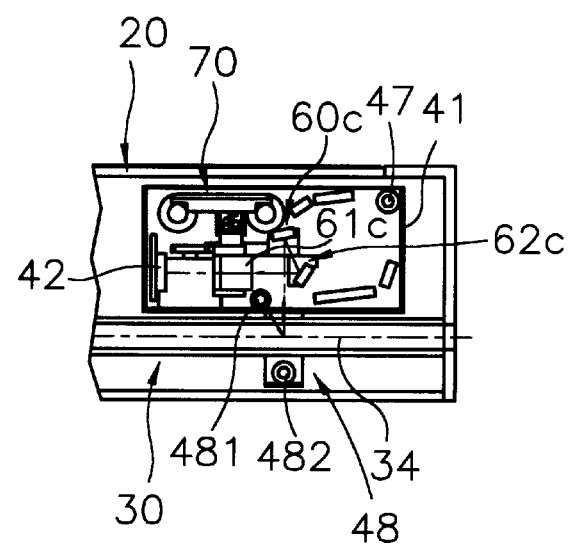

Referring to FIGS. 8, 9a and 9b, when the object of second data type 34 is read at the third resolution, the imaging system 60c is positioned to generate an image of the object of second data type 34 on the detector 42. As shown in FIG. 9a, for transmitted light the transmission light source 482 is used. As shown in FIG. 9b, for reflected light the reflection light source 481 is used. The third resolution of the imaging system 60c is lower than the second resolution of the imaging system 60b. So a larger object of second data type 34 is scanned with the third resolution, either in transmission (see FIG. 9a) or in reflection (see FIG. 9b), adding to the flexibility of use of the present invention.

Figure 10:
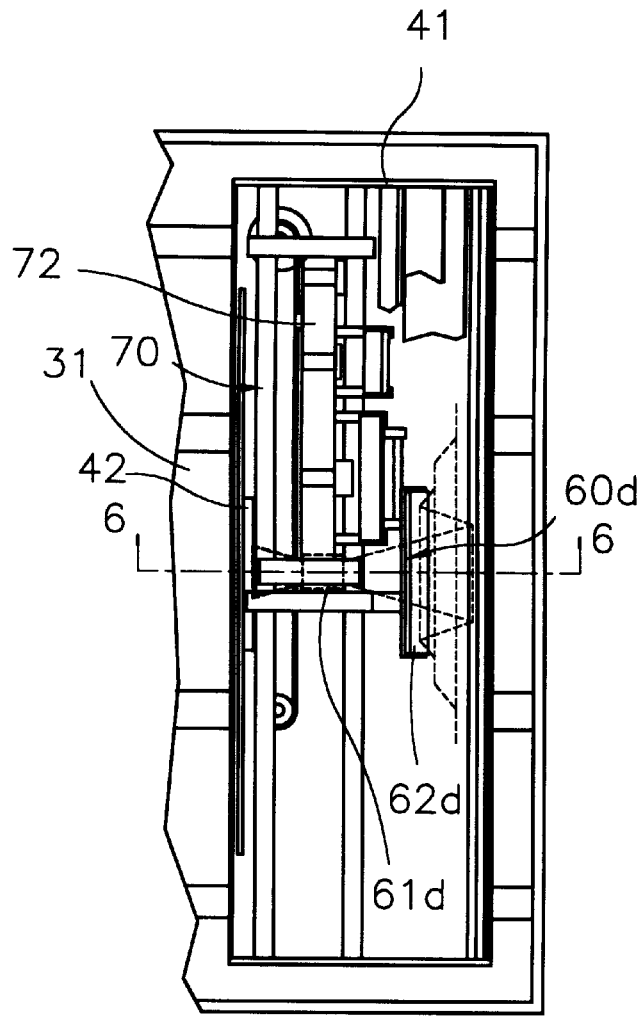
FIG. 10 is a top view of the image scanning apparatus of the present invention in the first embodiment, while the first data type is read at the fourth resolution.
Figure 11:
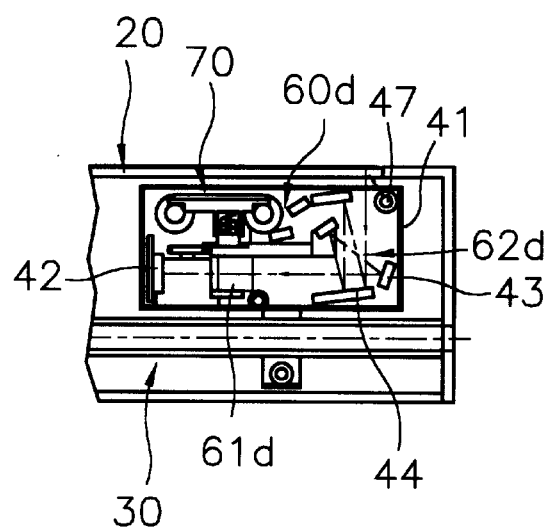
FIG. 11 is a side view of the image scanning apparatus of the present invention in the first embodiment, while the first data type is read at the fourth resolution.

Referring to FIGS. 10 and 11, when the object of first data type 23 is read at the fourth resolution, the imaging system 60d is positioned to generate an image of the object of first data type 23 on the detector 42. The fourth resolution of the imaging system 60d is higher than the first resolution of the imaging system 60a. So a smaller object of first data type 23 is scanned with the fourth resolution.

Figure 12:
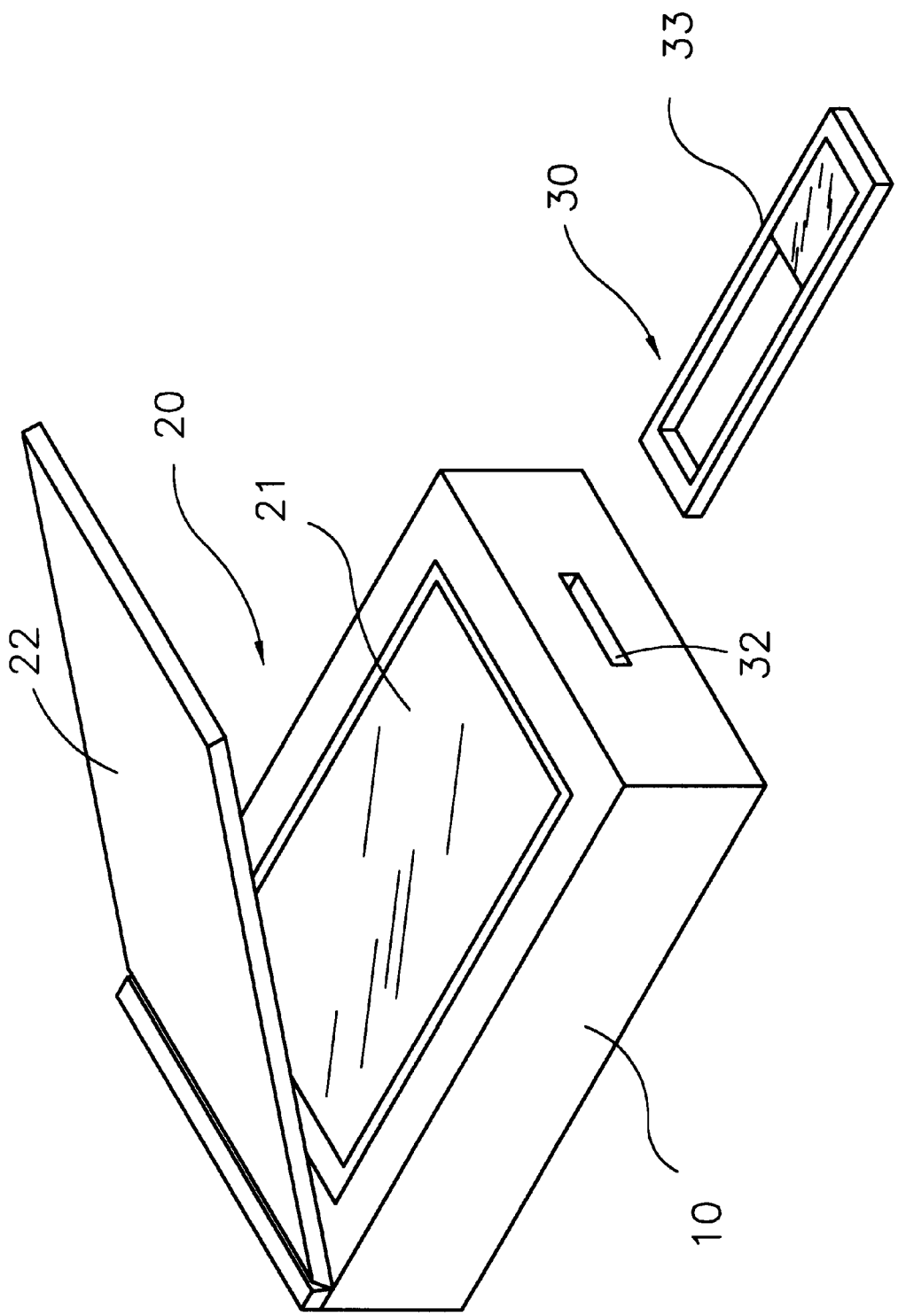
FIG. 12 is a perspective outside view of the image scanning apparatus of the present invention in the first embodiment.

Referring to FIG. 12, two different carriers, the first and second carriers 20, 30 are available for the objects of first and second data type 23, 34. The first carrier 20 lies on the top side of the main body 10, while the second carrier 30 accommodates the scanned object on the tray 33 inserted in the slot 31 through the opening 32. Thus various objects of different types are scanned conveniently and without risk of being mixed up.

Figure 13:
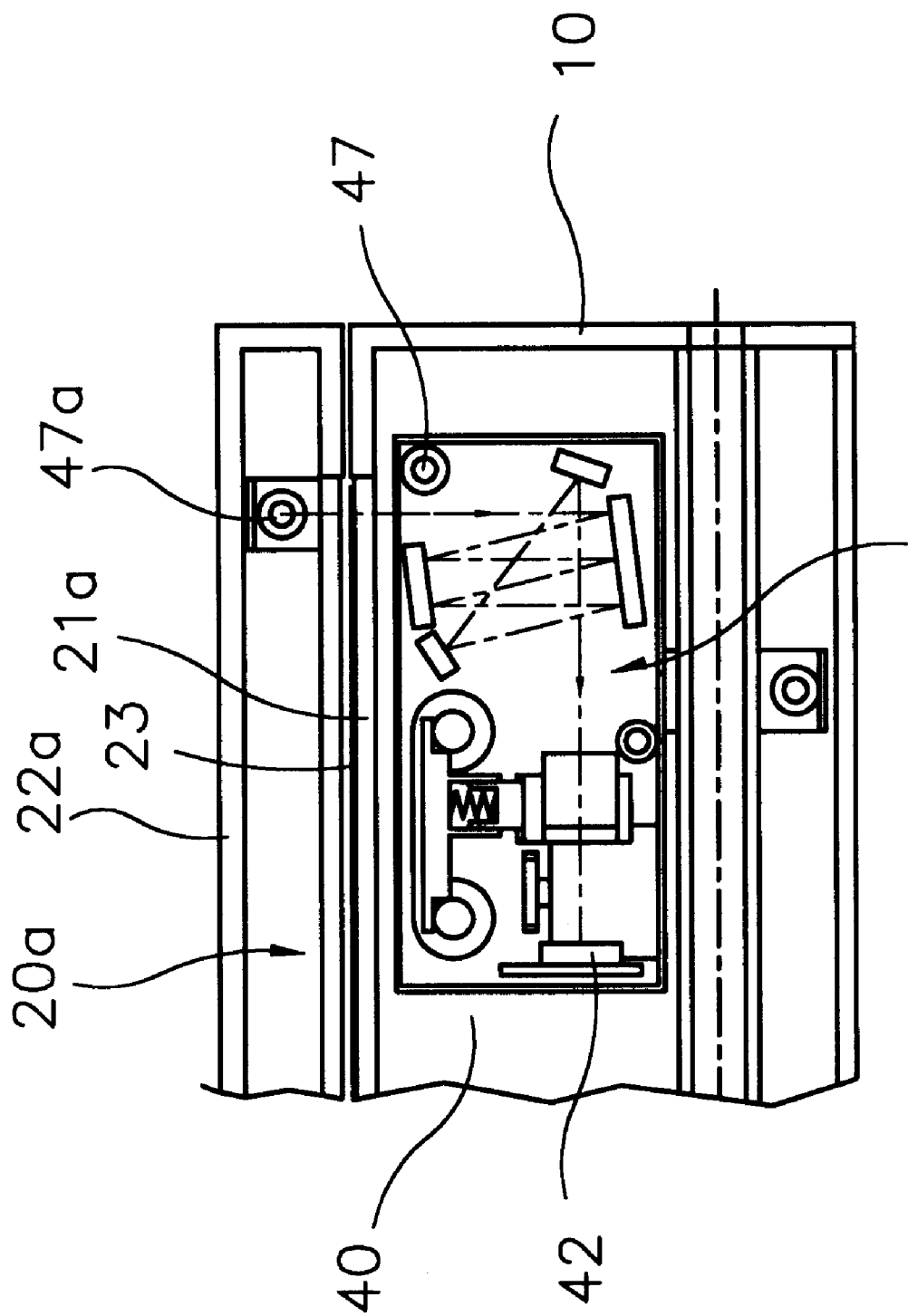
FIG. 13 is a partial longitudinal sectional view of the image scanning apparatus of the present invention in the second embodiment.
Figure 14:
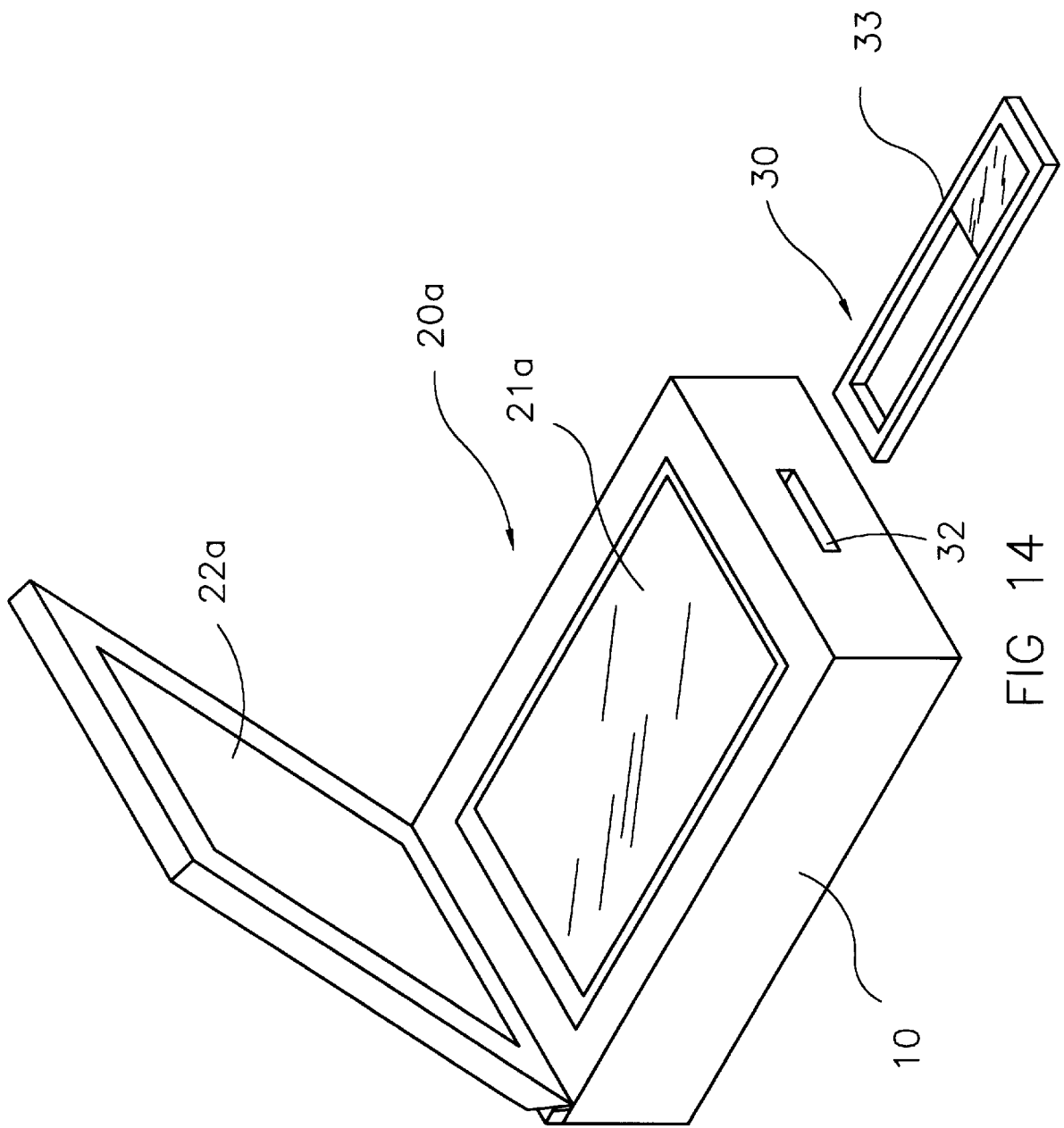
FIG. 14 is a perspective outside view of the image scanning apparatus of the present invention in the second embodiment.

Referring to FIGS. 13 and 14, the multiple-resolution image scanning apparatus in a second embodiment has a first carrier 20a, on the top side of which an additional illuminating system 22a is mounted. The illuminating system 22a has an inner side, where a transmission light source 47a is installed. The transmission light source 47a moves along with the scanning system 40 or, alternatively, is a light panel with an area uniformly emanating light. Light from the transmission light source 47a passes through the transparent plate 21 before entering the scanning system 40. Thus transparents are usable as objects of first data type 23.

Referring to FIGS. 15–20, the multiple-resolution image scanning apparatus in a third embodiment has a main body 10b and a scanning system 40b, offering various resolutions and light paths. The scanning system 40b has a detector 42b and several imaging systems 80a, 80b, 80c, 80d. The imaging systems 80a, 80b, 80c, 80d are respectively provided with lenses 81a, 81b, 81c, 81d and mirror groups 82a, 82b, 82c, 82d, corresponding thereto. The lenses 81a, 81b, 81c, 81d have different scanned areas for different resolutions, and the mirror groups 82a, 82b, 82c, 82d determine different light paths, which ensure proper imaging on the detector 42b. The scanning system 40b is further provided with a switching system 90 for switching between the imaging systems 80a, 80b, 80c, 80d.

Figure 15:
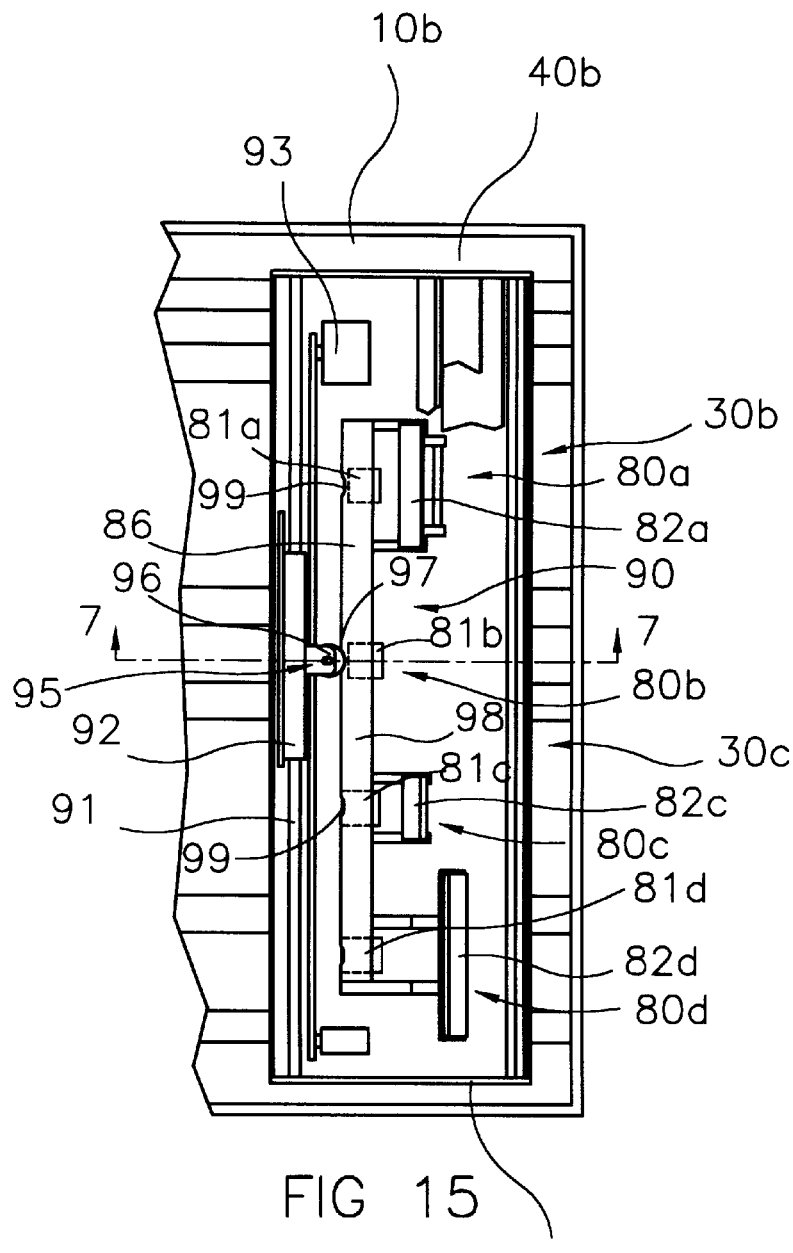
FIG. 15 is a top view of the image scanning apparatus of the present invention in the third embodiment.
Figure 16:
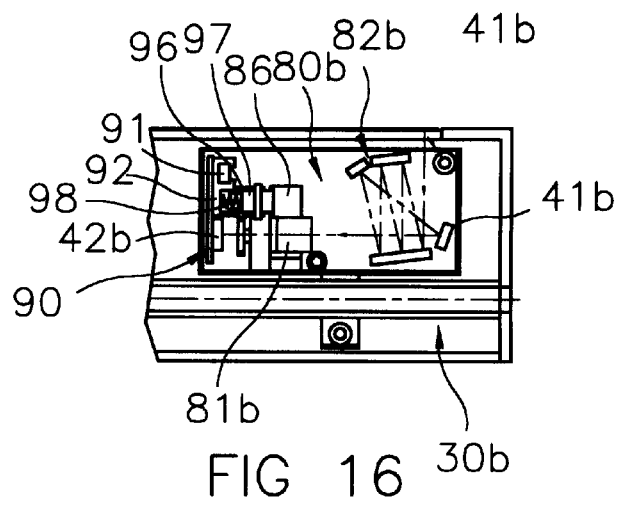
FIG. 16 is a longitudinal sectional view of the image scanning apparatus of FIG. 15, taken along line 7—7.
Figure 17:
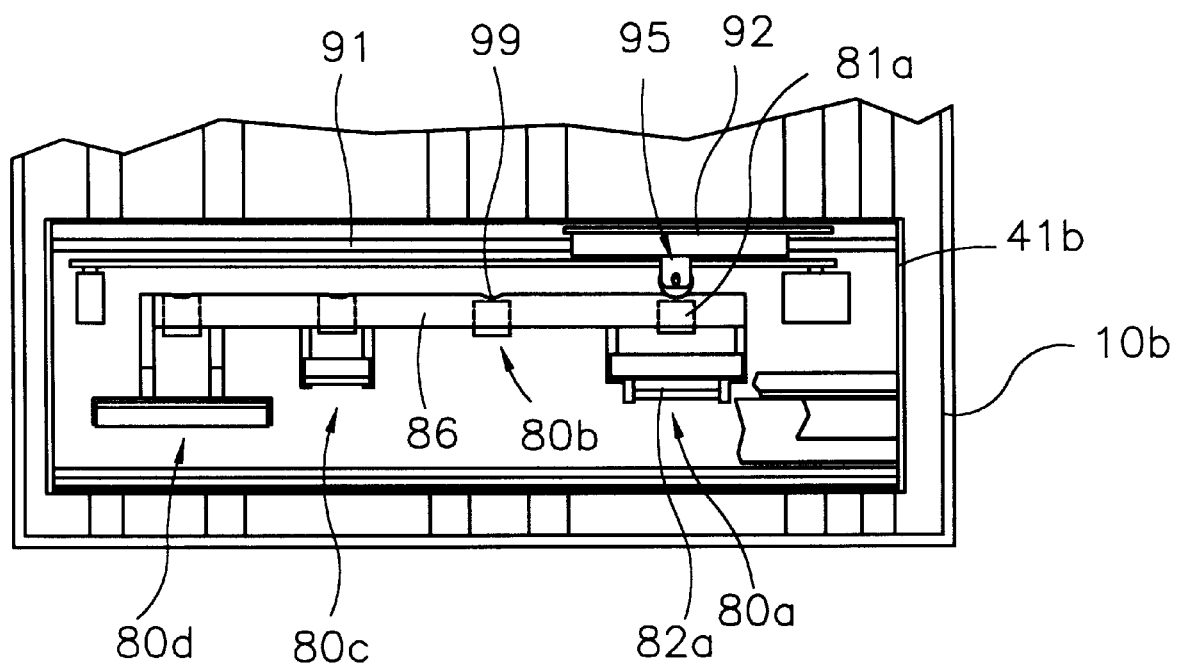
FIGS. 17–19 are top views of the image scanning apparatus of the present invention in the third embodiment at various resolutions.
Figure 18:
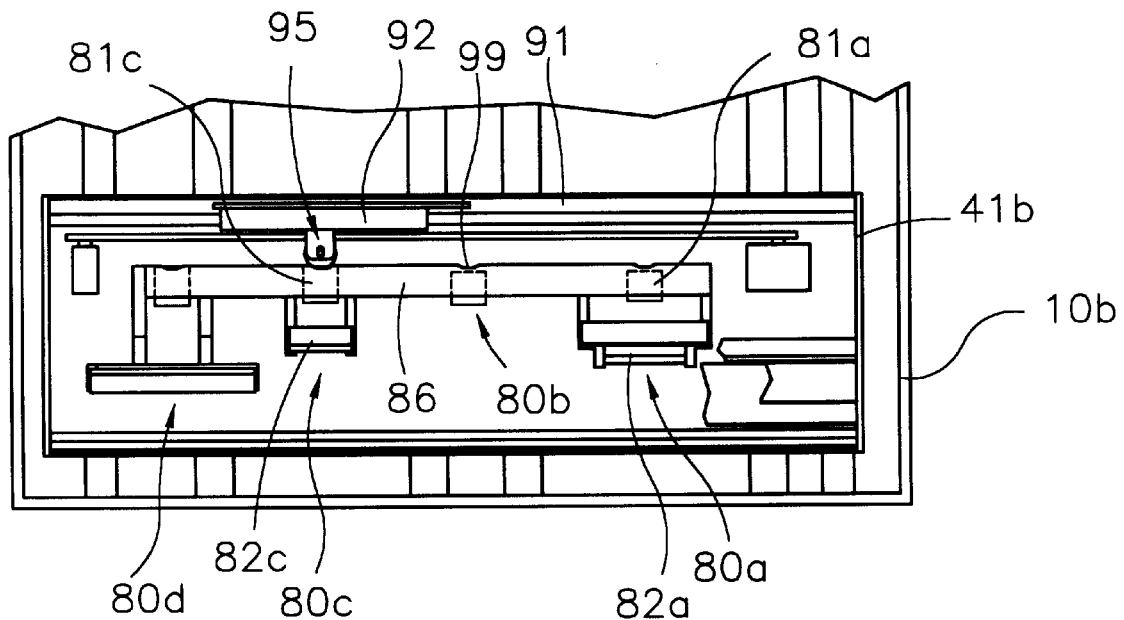
Figure 19:
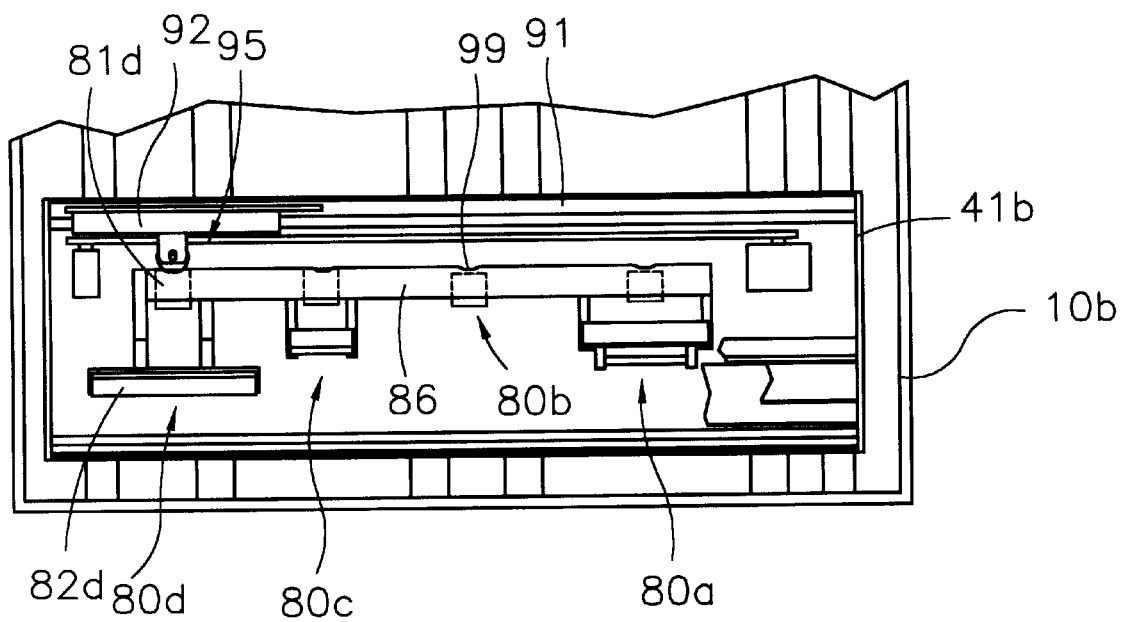
Figure 20:
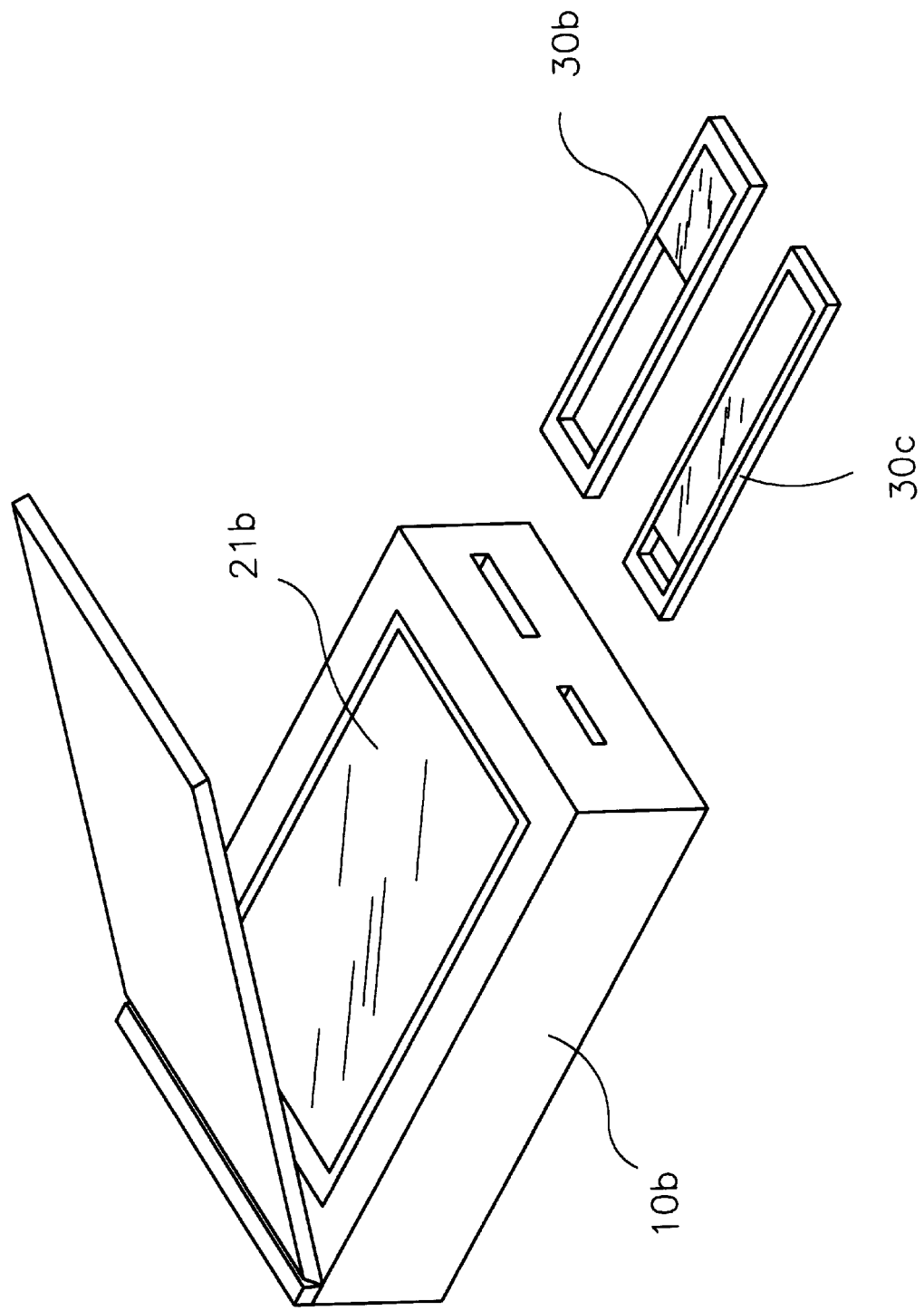
FIG. 20 is a perspective outside view of the image scanning apparatus of the present invention in the third embodiment.

As shown in FIGS. 15 and 16, the switching device 90 comprises: a rail 91, roughly oriented in the transverse direction; a gliding seat 92, gliding on the rail 91 and carrying the detector 42b; a driving system 93 for driving the detector 42b along the rail 91 and bringing the detector 42b behind one of the imaging systems 80a, 80b, 80c, 80d and thus into one of several detector reading positions; and at least one positioning device 95. The at least one positioning device 95 serves to fix the detector 42b in the detector reading positions. The positioning device 95 comprises: a holder 96, which is mounted on the gliding seat 92; a blocking element 97, glidingly mounted on the holder 96; a spring 98, inserted between the holder 96 and the blocking element 97 and pressing the blocking element 97 to project out of the holder 96; and a positioning block 86, mounted on the scanning system 40b and having several positioning depressions 99 for engaging with the blocking element 97. When the gliding seat 92 moves along the transverse direction, the blocking element 97 thereon engages with the positioning depressions 99 in the detector reading positions. Thus, for reading various data types, the detector 42b is stably positioned behind the imaging systems 80a, 80b, 80c, 80d.

In the third embodiment of the present invention, the imaging systems 80a, 80b, 80c, 80d have fixed positions, and, for switching resolutions, the detector 42b moves.

As shown in FIGS. 15–20, since the imaging systems 80a, 80b, 80c, 80d have fixed positions, the light paths for scanning objects of different data types are different. So the main body 10b has two second carriers 30b, 30c in suitable positions.

Figure 21:
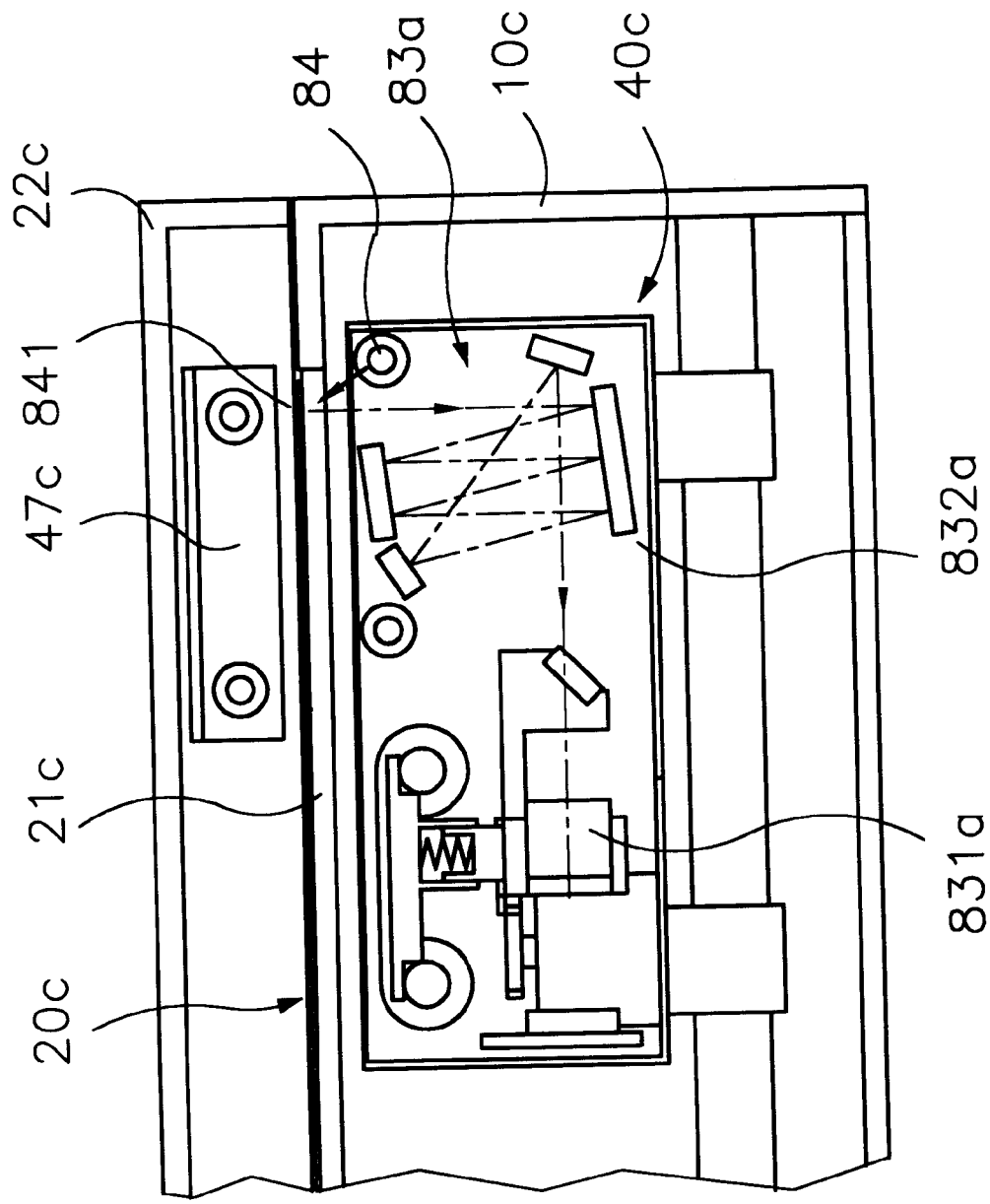
FIG. 21 is a top view of the image scanning apparatus of the present invention in the fourth embodiment, while an object of the first data type is placed.
Figure 22:
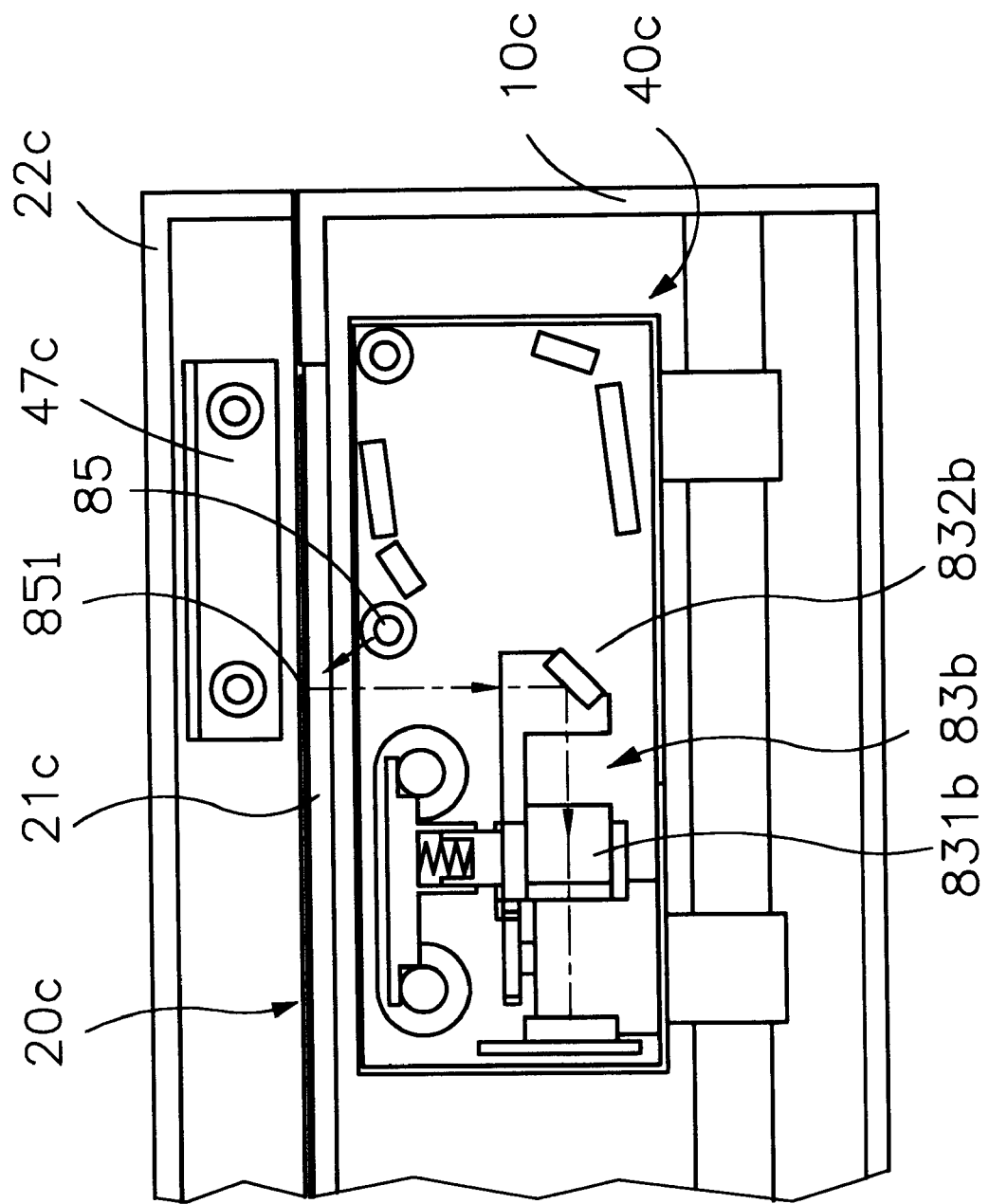
FIG. 22 is a top view of the image scanning apparatus of the present invention in the fourth embodiment, while an object of the second data type is placed.

Referring to FIGS. 21–23, the multiple-resolution image scanning apparatus in a fourth embodiment has a single carrier 20c with a transparent plate 21c, for accommodating objects of various data types to be scanned, and a scanning system 40c. As shown in FIGS. 21 and 22, the scanning system 40c has at least two imaging systems 83a, 83b, which provide different resolutions and light paths, a first light source 84 and a second light source 85, which work as reflection light sources. On the top side of the carrier 10c an additional illuminating system 22c is mounted. The illuminating system 22c has an inner side, where a transmission light source 47c is installed. The transmission light source 47c moves along with the scanning system 40c or, alternatively, is a light panel with an area uniformly emanating light. Light from the transmission light source 47c passes through the transparent plate 21c before entering the scanning system 40c. The first imaging system 83a has a lens 831a and a mirror group 832a, and the second imaging system 83b has a lens 831b and a mirror group 832b. The imaging systems 83a, 83b generate images of objects 841, 851 of different data types at different resolutions. Objects 841, 851 of different data types are laid on different positions on the carrier 20c.

The present invention provides in each of the embodiments an image scanning apparatus for multiple resolutions and object sizes. Objects of various sizes and data types are read on the image scanning apparatus of the present invention, making the image scanning apparatus of the present invention suitable for any application. The flexible arrangement of the imaging systems ensures the useability of any data type.

While the invention has been described with reference to preferred embodiments thereof, it is to be understood that modifications or variations may be easily made without departing from the spirit of this invention which is defined by the appended claims.

I claim:

1. A multiple-resolution image scanning apparatus comprising:
    a main body, having at least one carrier for accommodating an object of one of several data types to be scanned;
    a scanning system, installed in said main body and movable parallel to said carrier, said scanning system further comprising
        a detector,
        a light source for illuminating said object,
        at least two imaging systems, each of said at least two imaging systems having a lens and a mirror group corresponding to said lens for generating an image of an object of one of said several data types on said detector at a certain resolution with a certain light path, said resolutions and said light paths of said at least two imaging systems being different, and
        a switching system, which moves said at least two imaging systems and said detector relative to each other into reading positions, wherein in each of said reading positions said image is generated on said detector by one of said at least two imaging systems, allowing to scan objects of said several data types.

2. A multiple-resolution image scanning apparatus according to claim 1, wherein said at least one carrier comprises a first carrier with a transparent plate for carrying an object of first data type and at least one second carrier, which further comprises a slot, which is parallel to said first carrier, and an accommodating system, which is put into said slot and accommodates an object of second data type.

3. A multiple-resolution image scanning apparatus according to claim 2, wherein said light source of said scanning system comprises a first light source for illuminating said object of first data type and a second light source for illuminating said object of second data type.

4. A multiple-resolution image scanning apparatus according to claim 3, wherein said first light source comprises a reflection light source, which is mounted between said at least two imaging systems and said object of first data type, wherein light generated by said reflection light source is reflected by said object of first data type, passes through one of said at least two imaging systems and reaches said detector.

5. A multiple-resolution image scanning apparatus according to claim 3, wherein said second light source comprises a reflection light source, which is mounted between said at least two imaging systems and said object of second data type, wherein light generated by said reflection light source is reflected by said object of second data type, passes through one of said at least two imaging systems and reaches said detector.

6. A multiple-resolution image scanning apparatus according to claim 3, wherein said second light source comprises a transmission light source, said object of second data type lying between said transmission light source and said at least two imaging systems, wherein light generated by said transmission light source passes through said object of second data type, then through one of said at least two imaging systems and reaches said detector.

7. A multiple-resolution image scanning apparatus according to claim 2, wherein said first carrier has a top side, on which a transmission light source is installed, wherein light generated by said transmission light source passes through said object of first data type, through said transparent plate, then through one of said at least two imaging systems and reaches said detector.

8. A multiple-resolution image scanning apparatus according to claim 7, wherein said transmission light source moves along with said scanning system.

9. A multiple-resolution image scanning apparatus according to claim 7, wherein said transmission light source is a light panel with an area uniformly emanating light, which is in a fixed position.

10. A multiple-resolution image scanning apparatus according to claim 1, wherein said main body has a top side and said carrier is a transparent plate mounted on said top side of said main body, said carrier having positions for placing an object of first data type and for placing at least one object of second data type, and wherein said at least two imaging systems respectively generate images of said objects of first and second data type on said detector.

11. A multiple-resolution image scanning apparatus according to claim 10, wherein said light source of said scanning system comprises a first light source for illuminating said object of first data type and a second light source for illuminating said object of second data type.

12. A multiple-resolution image scanning apparatus according to claim 11, wherein said first light source comprises a reflection light source, which is mounted between said at least two imaging systems and said object of first data type, wherein light generated by said reflection light source is reflected by said object of first data type, passes through one of said at least two imaging systems and reaches said detector.

13. A multiple-resolution image scanning apparatus according to claim 12, wherein said second light source comprises a reflection light source, which is mounted between said at least two imaging systems and said object of second data type, wherein light generated by said reflection light source is reflected by said object of second data type, passes through one of said at least two imaging systems and reaches said detector.

14. A multiple-resolution image scanning apparatus according to claim 10, wherein said carrier has a top side, on which a transmission light source is installed, wherein light generated by said transmission light source passes through said objects of first data type and second data type, through said transparent plate, then through one of said at least two imaging systems and reaches said detector.

15. A multiple-resolution image scanning apparatus according to claim 14, wherein said transmission light source moves along with said scanning system.

16. A multiple-resolution image scanning apparatus according to claim 14, wherein said transmission light source is a light panel with an area uniformly emanating light, which is in a fixed position.

17. A multiple-resolution image scanning apparatus according to claim 1, wherein said switching system comprises:
    at least one rail;
    a gliding seat, glidingly mounted on said at least one rail and carrying said imaging systems;
    a driving system, driving said gliding seat on said at least one rail, so as to position said imaging systems in said reading positions;
    at least one positioning device for holding said imaging systems in said reading positions.

18. A multiple-resolution image scanning apparatus according to claim 17, wherein said positioning device comprises:
    at least one holder;
    at least one blocking element, mounted on said holder;
    at least one spring between said holder and said blocking element, pushing said blocking element to project out of said holder;

at least one positioning depression for engaging with said blocking element, so as to hold said imaging systems in said reading positions.

19. A multiple-resolution image scanning apparatus according to claim 1, wherein said switching system comprises:
   at least one rail;
   a gliding seat, glidingly mounted on said at least one rail and carrying said detector;
   a driving system, driving said gliding seat on said at least one rail, so as to position said detector in said reading positions;
   at least one positioning device for holding said detector in said reading positions.

20. A multiple-resolution image scanning apparatus according to claim 19, wherein said positioning device comprises:
   at least one holder;
   at least one blocking element, mounted on said holder;
   at least one spring between said holder and said blocking element, pushing said blocking element to project out of said holder;
   at least one positioning depression for engaging with said blocking element, so as to hold said detector in said reading positions.

* * * * *